United States Patent [19]

Best

[11] Patent Number: 4,579,834

[45] Date of Patent: Apr. 1, 1986

[54] POLYMERIZATION CATALYST, PRODUCTION AND USE

[75] Inventor: Steven A. Best, Houston, Tex.

[73] Assignee: Exxon Research & Engineering Co., Florham Park, N.J.

[21] Appl. No.: 680,853

[22] Filed: Dec. 12, 1984

[51] Int. Cl.$^4$ .............................................. C08F 4/68
[52] U.S. Cl. .................... 502/115; 502/110; 502/111; 502/119; 502/125; 502/126; 526/133; 526/134; 526/142; 526/151
[58] Field of Search ............... 502/110, 111, 115, 119, 502/125, 126, 116

[56] References Cited

U.S. PATENT DOCUMENTS

| | | | |
|---|---|---|---|
| 3,135,809 | 6/1964 | Bosmajian | 502/114 X |
| 4,173,547 | 11/1979 | Graff | 502/115 X |
| 4,385,161 | 5/1983 | Caunt et al. | 502/115 X |
| 4,434,242 | 2/1984 | Roling et al. | 502/111 X |
| 4,508,842 | 4/1985 | Beran et al. | 502/119 X |

FOREIGN PATENT DOCUMENTS

| | | |
|---|---|---|
| 0055589 | 7/1982 | European Pat. Off. . |
| 422192 | 8/1982 | U.S.S.R. . |

*Primary Examiner*—Patrick P. Garvin
*Attorney, Agent, or Firm*—M. B. Kurtzman

[57] ABSTRACT

A vanadium-containing catalyst component useful for the polymerization of olefins to polyolefins having a high molecular weight and a broad molecular weight distribution comprising polymerizing the polyolefins in the presence of a catalyst comprising (A) a vanadium-containing catalyst component obtained by contacting an inert support material with a dihydrocarbyl magnesium compound, optionally an oxygen-containing compound, a vanadium compound, a Group III metal halide, and (B) an aluminum alkyl cocatalyst.

24 Claims, No Drawings

POLYMERIZATION CATALYST, PRODUCTION AND USE

BACKGROUND OF THE INVENTION

This invention relates to a novel solid catalyst component to be employed with a cocatalyst for use in the polymerization of olefins to polyolefins such as polyethylene, polypropylene and the like, or copolymers such as ethylene copolymers with other alpha-olefins and diolefins, which catalyst component shows unusually high activity, excellent hydrogen response for the control of polymer molecular weight and good comonomer response for the production of copolymers. The polymer product obtained has a good balance of polymer properties, for example, the catalyst system obtains a polymer with a broad molecular weight distribution and an improved balance in polymer product machine direction tear strength and transverse direction tear strength. As a result, the blown film produced from the polymer product manifests an overall higher strength. The invention also relates to polymerization catalyst systems comprising said component and polymerization processes employing such catalyst systems.

The catalyst component comprises a solid reaction product obtained by sequentially contacting a solid, particulate, porous support material such as, for example, silica, alumina, magnesia or mixtures thereof, for example, silica-alumina, with a dihydrocarbyl magnesium compound, optionally an oxygen containing organic compound, a vanadium compound and under two separate steps a Group IIIa metal halide or hydrocarbyl halide. The catalyst component, which when used with an aluminum alkyl cocatalyst, provides the catalyst system of this invention which can be usefully employed for the polymerization of olefins.

The catalyst system can be employed in slurry, single-phase melt, solution and gas-phase polymerization processes and is particularly effective for the production of linear polyethylenes such as high-density polyethylene and linear low density polyethylene (LLDPE).

It is known that catalysts of the type generally described as Ziegler-type catalysts are useful for the polymerization of olefins under moderate conditions of temperature and pressure. It is also well known that the properties of polymer product obtained by polymerizing olefins in the presence of Ziegler-type catalysts vary greatly as a function of the monomers of choice, catalyst components, catalyst modifiers and a variety of other conditions which affect the catalytic polymerization process.

For the production of high strength film, it is desirable that polymer product have a high molecular weight. However, high molecular weight resins such as polyethylene, which generally are of a narrow molecular weight distribution are difficultly processable.

It is therefore desirable to provide polyolefin resins having a high molecular weight so as to obtain high strength films therefrom coupled with a broad molecular weight distribution so as to provide an easily processable resin. It is furthermore highly desirable that the resin be produced by a commercially feasible and economical process which obtains polymer product having a good balance of properties.

U.S. Pat. No. 4,434,242 of Roling et al, issued Feb. 28, 1984, teaches a polymerization process for preparing injection molded resins by polymerizing ethylene in the presence of a vanadium based catalyst. However, as taught in the patent, the process provides resins having a narrow molecular weight distribution suitable for injection molded resins rather than blow molded resins.

In European Patent Application No. 55589, Asahi teaches treating an oxide support with an organomagnesium composition, a chlorosilane and then treating with a titanium or vanadium compound that has at least one halogenated atom. As demonstrated in Example 7, the resin obtains a relatively narrow molecular weight distribution which is statistically in the same range as the resins produced in the presence of titanium based catalysts.

Soviet No. 422,192 treats a silica support with an organoaluminum compound and a chlorinating agent and thereafter adds $TiCl_4$ to the material so as to obtain an active catalyst. The production of polyethylene having a high molecular weight and coupled with a broad molecular weight distribution is not disclosed.

U.S. Pat. No. 4,385,161 of Caunt et al describes a catalyst component obtained by contacting an inert particulate material with an organic compound, a halogen-containing compound, including boron trichloride and a transition metal compound such as $VOCl_3$. The active ingredients can be added to the inert particulate material all together in a single stage or preferably by adding the various components in sequence with the transition metal compound being added in the last stage.

The above patents do not suggest how its processes might be modified to result in the rapid production of polymers having a broad molecular weight distribution preferably coupled with a high molecular weight so as to provide resins suitable for the production of high-strength film polymers having a high MI together with a relatively high MIR.

Furthermore, the patents do not disclose catalyst systems which show excellent responsiveness to hydrogen during the polymerization reaction for the control of molecular weight, do not disclose or evidence the excellent comonomer response so as to produce ethylene copolymers and particularly LLDPE, and particulary do not disclose highly active catalyst systems which will obtain polymer at a very high rate of production.

The patents do not particularly disclose the two-step Group IIIa metal halide treatment and the advantages obtained therefrom.

In my cofiled application U.S. Ser. No. 680,880, filed Dec. 12, 1984 there is disclosed a vanadium based catalyst component which includes a single-step Group IIIa metal halide in the component preparation.

In accordance with this invention catalyst combinations have been found which have extremely high catalyst activities, good comonomer incorporation, excellent hydrogen responsiveness for the control of molecular weight and obtain polymer product manifesting a broad molecular weight distribution with greatly improved film properties. The resins exhibit excellent melt strength with a surprising decrease in power consumption, hence an increase in extrusion rates, as well as excellent MD tear strength and dart impact strength.

The new catalyst systems and catalyst component of this invention are obtained by contacting a dihydrocarbyl magnesium compound, a vanadium metal compound and a Group IIIa metal halide or hydrocarbyl halide in the presence of an inert particulate support. The catalyst system employing the vanadium based catalyst component is advantageously employed in a gas phase ethylene polymerization process since there is a significant decrease in reactor fouling as generally compared with prior art ethylene gas phase polymerization processes thereby resulting in less frequent reactor shut downs for cleaning.

SUMMARY OF THE INVENTION

In accordance with the objectives of this invention there is provided a vanadium based catalyst component useful for the polymerization of alpha-olefins comprising a solid reaction product obtained by sequentially treating an inert solid support material in an inert solvent with (A) a dihydrocarbyl magnesium compound or a complex or mixture of an organic dihydrocarbyl magnesium compound and an aluminum compound, optionally (B) an oxygen-containing compound, (C) a Group IIIa metal halide or hydrocarbyl halide, (D) at least one vanadium compound and in the last step of the catalyst component preparation a Group III metal halide or hydrocarbyl halide.

The solid vanadium based catalyst component when employed in combination with a cocatalyst such as an alkyl aluminum cocatalyst provides a catalyst system which demonstrates a number of unique properties that are of great importance in the olefin polymerization technology such as, for example, extremely high catalytic activity, the ability to obtain high molecular weight resins and the ability to control the resin molecular weight during the polymerization reaction as a result of the improved responsiveness to hydrogen so as to produce resins having a high MIR, increased polymer yield, and reduced reactor fouling. Preferably, the resins produced will manifest a broad molecular weight distribution coupled with a high molecular weight thereby facilitating the production of films having improved melt strength and tear strength.

In a preferred embodiment of the invention the (A) dihydrocarbyl magnesium compound is represented by the formula $R^1MgR^2$ wherein $R^1$ and $R^2$, which can be the same or different, are selected from alkyl groups, aryl groups, cycloalkyl groups and aralkyl groups having from 1 to 20 carbon atoms, the (D) vanadium compounds are hydrocarbon-soluble vanadium compounds in which the vanadium valence is 3 to 5 (mixtures of the vanadium compounds can be employed), and the (C) and (E) Group IIIa metal halide is a Group IIIa metal hydrocarbyl dihalide or boron trichloride. The optional oxygen-containing compound is preferably selected from ketones, aldehydes, alcohols, siloxanes or mixtures thereof. It is desirable that if the (B) oxygen-containing alcohol, aldehyde, ketone or siloxane is employed, the inert solid support material can alternatively be treated with (i) the (A) dihydrocarbyl magnesium compound and the (B) oxygen-containing compound simultaneously, (ii) the reaction product of the (A) dihydrocarbyl magnesium compound and the (B) oxygen-containing compound, (iii) the (B) oxygen-containing compound followed by treating with the (A) dihydrocarbyl magnesium compound, or (iv) the (A) dihydrocarbyl magnesium compound followed by treating with the (B) oxygen-containing compound.

In any event, other orders of addition are acceptable in accordance with this invention so long as the last two steps in the catalyst component preparation involve the vanadium addition followed by the Group IIIa metal halide addition steps.

In accordance with this invention it is important that in the preparation of the catalyst component the Group IIIa metal halide treatment be performed in the last step.

In a second embodiment of this invention there is provided a catalyst system comprising the vanadium containing solid catalyst component and an organoaluminum cocatalyst for the polymerization of alpha-olefins using the catalyst of this invention under conditions characteristic of Ziegler polymerization.

In view of the high activity of the catalyst system prepared in accordance with this invention as compared with conventional vanadium based catalysts, it is generally not necessary to deash polymer product since polymer product will generally contain lower amounts of catalyst residues than polymer product produced in the presence of conventional catalyst.

The catalyst systems can be employed in a gas phase process, single phase melt process, solvent process or slurry process. The catalyst system is usefully employed in the polymerization of ethylene and other alpha-olefins, particularly alpha-olefins having from 3 to 8 carbon atoms and copolymerization of these with other 1-olefins or diolefins having from 2 to 20 carbon atoms, such as propylene, butene, pentene and hexene, butadiene, 1,4-pentadiene and the like so as to form copolymers of low and medium densities. The supported catalyst system is particularly useful for the polymerization of ethylene and copolymerization of ethylene with other alpha-olefins in gas phase processes to produce LLDPE or HDPE.

DESCRIPTION OF THE PREFERRED EMBODIMENTS

Briefly, the catalyst components of the present invention comprise the treated solid reaction product of (A) a dihydrocarbyl magnesium compound (B) optionally an oxygen-containing compound, (D) a vanadium compound, and (C) and (E), under two separate steps, a Group IIIa metal halide in the presence of an inert support material. According to the polymerization process of this invention, ethylene, at least one alpha-olefin having 3 or more carbon atoms or ethylene and other olefins or diolefins having terminal unsaturation are contacted with the catalyst under polymerizing conditions to form a commercially useful polymeric product. Typically, the support can be any of the solid particulate porous supports such as talc, silica, zirconia, thoria, magnesia, and titania. Preferably the support material is a Group IIa, IIIa, IVa and IVb metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuum or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are, for example, $SiCl_4$, chlorosilanes, silylamines and the like. The chemical dehydration is accomplished by slurrying the inorganic particulate in an inert hydrocarbon solvent, such as, for example, heptane. During the dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature range during the chemical dehydration reaction can be from about 25° C. to about 120° C., however, higher and lower temperatures can be employed. Preferably the temperature will be from about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The preferred (A) organometallic compounds employed in this invention are the hydrocarbon soluble organomagnesium compounds represented by the formula $R^1MgR^2$ wherein each of $R^1$ and $R^2$ which may be the same or different are alkyl groups, aryl groups, cycloalkyl groups, aralkyl groups, alkadienyl groups or alkenyl groups. The hydrocarbon groups $R^1$ and $R^2$ can contain between 1 and 20 carbon atoms and preferably from 1 to about 10 carbon atoms.

Illustrative but non-limiting examples of magnesium compounds which may be suitably employed in accordance with the invention are dialkylmagnesiums such as diethylmagnesium, dipropylmagnesium, di-isopropylmagnesium, di-n-butylmagnesium, di-isobutylmagnesium, diamylmagnesium, dioctylmagnesium, di-n-hexylmagnesium, didecylmagnesium, and didodecylmagnesium; dicycloalkylmagnesium, such as dicyclohexylmagnesium; diarylmagnesiums such as dibenzylmagnesium, ditolylmagnesium and dixylylmagnesium.

Preferably the organomagnesium compounds will have from 1 to 6 carbon atoms and most preferably $R^1$ and $R^2$ are different. Illustrative examples are ethylpropylmagnesium, ethyl-n-butyl-magnesium, amylhexylmagnesium, n-butyl-s-butylmagnesium, and the like. Mixtures of hydrocarbyl magnesium compounds may be suitably employed such as for example dibutyl magnesium and ethyl-n-butyl magnesium.

The magnesium hydrocarbyl compounds are as generally obtained from commercial sources as mixtures of the magnesium hydrocarbon compounds with a minor amount of aluminum hydrocarbyl compound. The minor amount of aluminum hydrocarbyl is present in order to facilitate solubilization of the organomagnesium compound in hydrocarbon solvent. The hydrocarbon solvent usefully employed for the organomagnesium can be any of the well known hydrocarbon liquids, for example hexane, heptane, octane, decane, dodecane, or mixtures thereof, as well as aromatic hydrocarbons such as benzene, toluene, xylenes, etc.

The organomagnesium complex with a minor amount of aluminum alkyl can be represented by the formula $(R^1MgR^2)_p(R_3^6Al)_s$ wherein $R^1$ and $R^2$ are defined as above and $R^6$ has the same definition as $R^1$ and $R^2$ and p is greater than 0. The ratio of s/s+p is from 0 to 1, preferably from 0 to about 0.7 and most desirably from about 0 to 0.1.

Illustrative examples of the magnesium aluminum complexes are $[(n-C_4H_9)(C_2H_5)Mg][(C_2H_5)_3Al]_{0.02}$, $[(nC_4H_9)_2Mg][(C_2H_5)_3Al]_{0.013}$, $[(nC_4H_9)_2Mg][(C_2H_5)_3Al]_{2.0}$ and $[(nC_6H_{13})_2Mg][(C_2H_5)_3Al]_{0.01}$. A suitable magnesium aluminum complex is Magala ® BEM manufactured by Texas Alkyls, Inc.

The hydrocarbon soluble organometallic compositions are known materials and can be prepared by conventional methods. One such method involves, for example, the addition of an appropriate aluminum alkyl to a solid dialkyl magnesium in the presence of an inert hydrocarbon solvent. The organomagnesium-organoaluminum complexes are, for example, described in U.S. Pat. No. 3,737,393 and 4,004,071 which are incorporated herein by reference. However, any other suitable method for preparation of organometallic compounds can be suitably employed.

The optional oxygen containing compound which may be usefully employed in accordance with this invention are alcohols, aldehydes and ketones. Preferably the oxygen containing compounds are selected from alcohols and ketones represented by the formulas $R^3OH$ and $R^4COR^5$ wherein $R^3$ and each of $R^4$ and $R^5$ which may be the same or different can be alkyl groups, aryl groups, cycloalkyl groups, aralkyl groups, alkadienyl groups, or alkenyl groups having from 2 to 20 carbon atoms. Preferably the R groups will have from 2 to 10 carbon atoms. Most preferably the R groups are alkyl groups and will have from 2 to 6 carbon atoms. Illustrative examples of alcohols which may be usefully employed in accordance with this invention are ethanol, isopropanol, 1-butanol, t-butanol, 2-methyl-1-pentanol, 1-pentanol, 1-dodecanol, cyclobutanol, benzyl alcohol, and the like; diols, such as 1,6-hexanediol, and the like with the proviso that the diol be contacted with the magnesium compound subsequent to the magnesium compound treatment of the support material. The most preferred alcohol is 1-butanol.

The ketones will preferably have from 3 to 11 carbon atoms. Illustrative ketones are methyl ketone, ethyl ketone, propyl ketone, n-butyl ketone and the like. Acetone is the ketone of choice.

Illustrative of the aldehydes which may be usefully employed in the preparation of the organomagnesium compound include formaldehyde, acetaldehyde, propionaldehyde, butanol, pentanal, hexanal, heptanal, octanal, 2-methylpropanal, 3-methylbutanal, acrolein, crotonaldehyde, benzaldehyde, phenylacetaldehyde, o-tolualdehyde, m-tolualdehyde, and p-tolualdehyde.

Illustrative of the siloxanes which may be usefully employed in the preparation of the organomagnesium compound include hexamethyldisiloxane, octamethyltrisiloxane, octamethylcyclotetrasiloxane, decamethylcyclopentasiloxane, sym-dihydrotetramethyldisiloxane, pentamethyltrihydrotrisiloxane, methylhydrocyclotetrasiloxane, both linear and branched polydimethylsiloxanes, polymethylhydrosiloxanes, polyethylhydrosilixanes, polymethylethylsiloxanes, polymethyloctylsiloxanes, and polyphenylhydrosiloxanes.

The magnesium compound in whatever form can be conveniently added to the agitated slurry containing the inert particulate support such as silica in solution form, e.g., in hexane, benzene, toluene, etc. Alternatively, the magnesium compound can be added to the slurry in non-solution form.

The optional oxygen-containing compound can be added to the silica prior to the addition of the magnesium compound, immediately after the addition of the magnesium compound to the silica simultaneously with the magnesium compound or as the reaction product with the magnesium alkyl. Nevertheless, the magnesium alkyl treatment of the inert particulate support material can be followed by treatment with the Group IIIa metal halide prior to treatment with the oxygen-containing compound.

Accordingly, the active ingredients employed in forming the vanadium-based catalyst component of this invention are preferably added to the inert support material in one of the following orders:

A,C,D,E
C,A,D,E
A,C,B,D,E
C,A,B,D,E
A,B,C,D,E
(A+B),C,D,E
C,(A+B),D,E

In accordance with this invention, the Group IIIa metal halides are employed to obtain increased catalytic activity over similar catalyst systems absent the said halides. It has been discovered that the use of the metal halides obtain the desirable increase in activity without detrimentally affecting the broad molecular weight distribution obtained in accordance with this invention.

The vanadium compound which can be usefully employed in the preparation of the vanadium containing catalyst component of this invention are well known in the art and can be represented by the formulas $$VCl_x(OR)_{3-x}, \tag{1}$$

where $x = 0-3$ and $R = $ a hydrocarbon radical;

$$VCl_y(OR)_{4-y}, \tag{2}$$

where $y = 3-4$ and $R = $ a hydrocarbon radical;

$$V(AcAc)_z, \tag{3}$$ 

where $z = 2-3$ and (AcAc) = acetyl acetonate group;

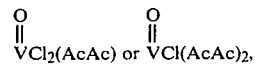

where (AcAc) = acetyl acetonate group; and $$VCl_3 \cdot nB, \tag{5}$$ 

where $n = 2-3$ and $B = $ Lewis base, such as tetrahydrofuran, which can form hydrocarbon-soluble complexes with $VCl_3$.

In formulas 1 and 2 above, R preferably represents a $C_1$ to $C_8$ aliphatic radical free of aliphatic unsaturation or aromatic hydrocarbon radical such as straight- or branded-chemical alkyl, aryl, cycloalkyl, alkanyl, aralkyl group such as methyl, ethyl, propyl, isopropyl, butyl, n-butyl, i-butyl, t-butyl, pentyl, hexyl, cyclohexyl, octyl, benzyl, dimethyl phenyl, naphthyl, etc.

Illustrative, but non-limiting examples of the vanadium compounds are vanadyl trichloride, vanadium tetrachloride, vanadium tetrabutoxy, vanadium trichloride, vanadyl acetylacetonate, vanadium acetylacetonate, vanadyl dichloroacetylacetonate, vanadium trichloride complexed with tetrahydrofuran, vanadyl chlorodiacetylacetonate, vanadyl tribromide, vanadium tetrabromide, and the like.

The vanadium compound is preferably added to the reaction mixture in the form of a solution. The solvent can be any of the well-known inert hydrocarbon solvents such as hexane, heptane, benzene, toluene, and the like.

The Group IIIa metal halides are preferably selected from boron trihalide and boron and aluminum dialkyl halides and mixtures thereof. The alkyl group can have from 1 to 12 carbon atoms. Illustrative, but non-limiting examples of the Group III metal alkyl halides are methyl aluminum dichloride, ethyl aluminum dichloride, propyl aluminum dichloride, butyl aluminum dichloride, isobutyl aluminum dichloride, pentyl aluminum dichloride, neopentyl aluminum dichloride, hexyl aluminum dichloride, octyl aluminum dichloride, decyl aluminum dichloride, dodecyl aluminum dichloride, methyl boron dichloride, ethyl boron dichloride, propyl boron dichloride, butyl boron dichloride, isobutyl boron dichloride, pentyl boron dichloride, neopentyl boron dichloride, hexyl boron dichloride, octyl boron dichloride, decyl boron dichloride and the like. The preferred Group III metal halides are boron trichloride, ethyl aluminum dichloride and ethyl boron dichloride.

Preferably, the Group III halide treatment step will be from about 4 hours to 6 hours, however, greater or lesser time can be used for the treatment.

The Group IIIa metal halide is conveniently added to the reaction slurry which comprises the solid particulate material, or the solid reaction product from the treatment of the solid particulate material and the aluminum alkyl. The addition of the halogen containing compound can be effected by using a solution of the halogen-containing compound in an inert solvent such as, for example, a aliphatic hydrocarbon solvent or a aromatic hydrocarbon solvent. The halogen-containing compound can also be added as a gas. The halogen-containing compound can also be added at two separate steps during the catalyst component preparation, for example, after the metal alkyl treatment and thereafter after the vanadium compound treatment.

The treatment of the support material as mentioned above is conducted in an inert solvent. The inert solvent can be the same as that employed to dissolve the individual ingredients prior to the treatment step. Preferred solvents include mineral oils and the various hydrocarbons which are liquid at reaction temperatures and in which the individual ingredients are soluble. Illustrative examples of useful solvents in addition to those mentioned above include the alkanes such as pentane, isopentane, hexane, heptane, octane and nonane; cycloalkanes such as cyclopentane, cyclohexane; and aromatics such as benzene, toluene, ethylbenzene and diethylbenzene. The amount of solvent employed is not critical. Nevertheless, the amount employed should be sufficient so as to provide adequate heat transfer away from the catalyst components during reaction and to permit good mixing.

The amounts of catalytic ingredients employed in the preparation of the solid catalyst component can vary over a wide range. The concentration of magnesium compound deposited on the essentially dry, inert support can be in the range from about 0.1 to about 100 millimoles/g of support, however, greater or lesser amounts can be usefully employed. Preferably, the magnesium compound concentration is in the range of 0.1 to 10 millimoles/g of support and more preferably in the range of 0.5 to 1.1 millimoles/g of support. The total amount of Group IIIa metal halide employed should be such as to provide a halogen to magnesium mole ratio of about 1 to about 10 and preferably 2 to 6.

In any event, in each Group IIIa metal halide treatment step, the amount employed should provide a halogen to magnesium mole ratio in the range of about 1 to 5 and preferably 1 to 3.

The magnesium to optional oxygen-containing compound mole ratio can be in the range of from about 0.05 to about 20. Preferably, the ratio is in the range of 0.5 to about 2 and more preferably 0.5 to about 1.5. The hydrocarbyl groups on the oxygen-containing compounds should be sufficiently large so as to insure solubility of the reaction product.

The vanadium compound is added to the inert support reaction slurry at a concentration of about 0.1 to about 10 millimoles V/g of dried support, preferably in the range of about 0.1 to about 1 millimoles V/g of dried support and especially in the range of about 0.1 to 0.5 millimoles V/g of dried support.

Generally, the individual reaction steps can be conducted at temperatures in the range of about $-50°$ C. to about 150° C. Preferred temperature ranges are from about $-30°$ C. to about 60° C. with $-10°$ C. to about 50° C. being most preferred. The reaction time for the individual treatment steps can range from about 5 minutes to about 24 hours. Preferably the reaction time will be from about ½ hour to about 8 hours. During the reaction constant agitation is desirable.

In the preparation of the vanadium metal-containing solid catalyst component, washing after the completion of any step may be effected.

The catalyst components prepared in accordance with this invention are usefully employed with cocatalysts well known in the art of the Ziegler catalysis for polymerization of olefins. Typically, the cocatalysts which are used together with the transition metal containing catalyst component are organometallic compounds of Group Ia, IIa and IIIa metals such as aluminum alkyls, aluminum alkyl hydrides, lithium aluminum alkyls, zinc alkyls, magnesium alkyls and the like. The cocatalysts preferably used are the organoaluminum compounds. The preferred alkylaluminum compounds are represented by the formula $AlR'_nX'_{3-n}$ wherein R' is hydrogen, hydrocarbyl or substituted hydrocarbyl group and n is as defined herein above. Preferably R' is an alkyl group having from 2 to 10 carbon atoms. Illustrative examples of the cocatalyst material are ethyl aluminum dichloride, ethyl aluminum sesquichloride, diethyl aluminum chloride, aluminum triethyl, aluminum tributyl, diisobutyl aluminum hydride, diethyl aluminum ethoxide and the like. Aluminum trialkyl compounds are most preferred with triisobutylaluminum and aluminum triethyl being highly desirable. X' is halogen and preferably chlorine.

The catalyst system comprising the aluminum alkyl cocatalyst and the vanadium metal containing solid catalyst component is usefully employed for the polymerization of ethylene, other alpha-olefins having from 3 to 20 carbon atoms, such as for example, propylene, butene-1, pentene-1, hexene-1, 4-methylpentene-1, and the like and ethylene copolymers with other alpha-olefins or diolefins such as 1,4-pentadiene, 1,5-hexadiene, butadiene, 2-methyl-1,3-butadiene and the like. The polymerizable monomer of preference is ethylene. The catalyst system may be usefully employed to produce polyethylene or copolymers of ethylene by copolymerizing with other alpha-olefins or diolefins, particularly propylene, butene-1, pentene-1, hexene-1, and octene-1. The catalyst is especially useful for the preparation of high molecular weight LLDPE and HDPE and have broad molecular weight distribution. Typically the polymers will have an MI from 0.1 to 10 dg/min and MIR from about 30 to about 80. The olefins can be polymerized in the presence of the catalysts of this invention by any suitable known process such as, for example, suspension, solution and gas-phase processes.

The polymerization reaction employing catalytic amounts of the above-described solid catalyst can be carried out under conditions well known in the art of Ziegler polymerization, for example, in an inert diluent at a temperature in the range of 50° C. to 120° C. and a pressure of 1 and 40 atmospheres in the gas phase at a temperature range of 70° C. to 100° C. at about 1 atmosphere to 50 atmospheres and upward. Illustrative of the gas-phase processes are those disclosed in U.S. Pat. Nos. 4,302,565 and 4,302,566, which references are hereby incorporated in their entirety by reference. As indicated above, one advantageous property of the catalyst system of this invention is the reduced amount of gas phase reactor fouling. The catalyst system can also be used to polymerize olefins at single phase conditions, i.e., 150° C. to 320° C. and 1,000–3,000 atmospheres. At these conditions the catalyst lifetime is short but the activity sufficiently high that removal of catalyst residues from the polymer is unnecessary. However, it is preferred that the polymerization be done at pressures ranging from 1 to 50 atmospheres, preferably 5 to 25 atmospheres.

Improved yields can be further obtained by employing polymerization promoters (activators) in combination with the catalyst system of this invention. The polymerization activators, in accordance with this invention, are preferably chlorocarbon activators. The activators are generally added to the polymerization reactor as a separate component. However, in the alternative, the activator can be adsorbed onto the surface of the catalyst component of this invention. The activator serves to significantly increase the productivity of the catalyst. Illustrative but non-limiting examples of the chlorocarbons are $CHCl_3$, $CFCl_3$, $CH_2Cl_2$, ethyltrichloroacetate, methyltrichloroacetate, hexachloropropylene, butylperchlorocrotonate, 1,3-dichloropropane, 1,2,3-trichloropropane, and 1,1,2-trichlorotrifluoroethane, etc. The activators may be gases or liquids at the conditions of polymerization.

In the processes according to this invention it has been discovered that the catalyst system is highly responsive to hydrogen for the control of molecular weight. Other well known molecular weight controlling agents and modifying agents, however, may be usefully employed.

The polyolefins prepared in accordance with this invention can be extruded, mechanically melted, cast or molded as desired. They can be used for plates, sheets, films and a variety of other objects.

While the invention is described in connection with the specific examples below, it is understood that these are only for illustrative purposes. Many alternatives, modifications and variations will be apparent to those skilled in the art in light of the below Examples and such alternatives, modifications and variations fall within the general scope of the claims.

In the Examples following the silica support was prepared by placing Davison Chemical Company G-952 silica gel in a vertical column and fluidizing with an upward flow of $N_2$. The column was heated slowly to 600° C. and held at that temperature for 12 hours after which the silica was cooled to ambient temperatures.

The melt index (MI) and melt index ratio (MIR) were measured in accordance with ASTM Test D1238.

EXAMPLE 1

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged 6.0 ml of a solution of butyl ethyl magnesium (BEM) obtained from Texas Alkyls, Inc. comprising 0.69 mmole BEM/ml solution. The BEM solution was added dropwise at 60° C. while stirring the slurry vigorously. Stirring was continued for 1 hour. A 3.7 ml portion of a solution of boron trichloride in hexane (1.0 mmoles/ml solution) was added to the reaction slurry under constant stirring which continued for 1 hour. To the reaction slurry there was then added a 3 ml portion of a solution of $VO(OBu)_3$ in nonane (0.35 mmoles/ml solution). The temperature was gradually increased to 110° C. while stirring constantly. The stirring at 110° C. was continued for 1 hour. The temperature was then lowered to 60° C. and 3.7 ml of a boron trichloride solution in hexane (1.0 mmol/ml) was added to the reaction slurry under constant stirring. The slurry was filtered, the solids recovered and washed with hexane and dried in vacuo.

Polymerization

To a 1.8 liter autoclave was charged 800 ml of purified hexane, 1.8 mmoles of triisobutyl aluminum in 2.0 ml of heptane solution and trichloroflouromethane activator was injected into the reactor so as to provide a 200:1 activator/vanadium ratio. 5 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 45 ml of butene-1. The reactor was maintained at a total pressure of 300 psig by constant flow of ethylene. The polymerization was maintained for 40 minutes upon which time polymerization was stopped, the reactor cooled and the polymer was filtered. The resulting polymer had an MI of 0.3, an MIR of 64.9. The specific activity (Kgr $PE/g$-V-hr-m/$lC_2^{--}$) was 354.7.

EXAMPLE 2

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged a 6 ml of a solution of butyl ethyl magnesium (BEM) obtained from Texas Alkyls, Inc. comprising 0.69 mmole BEM/ml solution. The BEM solution was added dropwise at 60° C. while stirring the slurry vigorously. Stirring was continued for 1 hour. A 2.4 ml portion of a solution of ethyl aluminum dichloride in heptane (1.57 mmoles/ml solution) was added to the reaction slurry under constant stirring which continued for 1 hour. To the reaction slurry there was then added a 3 ml portion of a solution of $VO(OBu)_3$ in nonane (0.35 mmoles/ml solution). The temperature was gradually increased to 110° C. while stirring constantly. The stirring at 110° C. was continued for 1 hour. The temperature was then lowered to 60° C. and 2.4 ml of a ethyl aluminum dichloride solution in heptane (1.57 mmoles/ml) was added to the reaction slurry under constant stirring. The slurry was filtered, the solids recovered and washed with hexane and dried in vacuo.

Polymerization

The polymerization was performed under conditions as described in Example 1. The resulting polymer had an MI of 1.2, an MIR of 47.9. The specific activity (Kgr $PE/g$-V-hr-m/$lC_2^{--}$) was 103.8.

EXAMPLE 3

Preparation of Catalyst Component

The catalyst was prepared as described in Example 2.

Polymerization

To a 18 liter autoclave was charged 800 ml of purified hexane, 1.8 mmoles of triisobutyl aluminum in 2.0 ml of heptane solution and trichlorofluoromethane activator was injected into the reactor so as to provide a 200:1 activator/vanadium ratio. 5 ml of a white oil slurry containing the vanadium-based solid having a concentration of 0.05 g of vanadium solid per cc was added to the reactor via syringe. The reactor was heated to 85° C., pressured to 30 psig with hydrogen, followed by pressuring to 150 psig with ethylene containing 45 ml of butene-1. The reactor was maintained at a total pressure of 275 psig by constant ethylene flow. The polymerization was maintained for 40 minutes upon which time polymerization was stopped, the reactor cooled and the polymer was filtered off. The resulting polymer had an MI of 227.8. The specific activity (Kgr $PE/g$-V-hr-m/$lC_2^{--}$) was 206.1.

EXAMPLE 4

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged 3.7 ml of a solution of boron trichloride in hexane (1.0 mmol/ml solution). The suspension was stirred well for 1 hour at 60° C. To the slurry was added 6 ml of butyl ethyl magnesium (BEM) in heptane (0.69 mmoles/ml solution). The BEM was added dropwise at ambient temperatures under vigorous stirring which was continued for 1 hour. To the slurry was then slowly added 3 ml of a solution of $VO(OBu)_3$ in nonane (0.35 mmoles/ml solution) as the temperature was gradually increased to 110° C. while stirring vigorously. Stirring was continued for 1 hour. The temperature was decreased to 60° C. and 3.7 ml of boron trichloride in hexane (3 mmoles/ml) was injected into the vial at 60° C. Stirring was continued for 1 hour at 60° C. The slurry was filtered, the solids recovered and washed with hexane and dried in vacuo.

Polymerization

To a 1.8 liter autoclave was charged 800 ml of purified hexane, 0.9 mmoles of triisobutyl aluminum in 1.0 ml of heptane solution and trichlorofluoromethane activator was injected into the reactor so as to provide a 200:1 activator/vanadium ratio. 5 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 30 ml of butene-1. The reactor was maintained at a total pressure of 300 psig by constant ethylene flow. The polymerization was maintained for 40 minutes upon which time polymerization was stopped, the reactor cooled and the polymer was filtered off. The resulting polymer had an MI of 7.48, an MIR of 39.3. The specific activity (Kgr PE/g-V-hr-m/lC$_2$--) was 343.2.

EXAMPLE 5

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged 2.4 ml solution of ethyl aluminum dichloride in heptane (1.5 mmoles/ml solution). The suspension was stirred well for 1 hour at 60° C. To the slurry was added 6 ml of butyl ethyl magnesium (BEM) in heptane (0.69 mmoles/ml solution). The BEM was added dropwise at 60° C. under vigorous stirring which was continued for 1 hour. To the slurry was then slowly added 3 ml of a solution of $VO(OBu)_3$ in nonane (0.35 mmoles/ml solution) as the temperature was gradually increased to 110° C. while stirring vigorously. Stirring was continued for 1 hour. The temperature was decreased to 60° C. and 2.4 ml of ethyl aluminum dichloride in heptane (3 mmoles/ml) was injected into the vial at 60° C. Stirring was continued for 1 hour at 60° C. The slurry was filtered, the solids recovered and washed with hexane and dried in vacuo.

Polymerization

The polymerization was run identically as in Example 1. The resulting polymer had an MI of 1.29, an MIR of 37.0. The specific activity (Kgr PE/g-V-hr-m/lC$_2$--) was 174.5.

EXAMPLE 6

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged 6 ml of a solution of butyl ethyl magnesium (BEM) in heptane obtained from Texas Alkyls, Inc. comprising 0.69 mmole BEM/ml solution. The BEM solution was added dropwise at 60° C. while stirring the slurry vigorously. Stirring was continued for 1 hour. A 3.7 ml portion of a solution of boron trichloride in hexane (1.0 mmol/ml solution) was added to the reaction slurry under constant stirring which continued for 1 hour. 4 mmoles of dried and degassed n-butanol was added to the suspension at 60° C. under constant stirring which stirring was continued for 1 hour. To the reaction slurry there was then added a 3 ml portion of a solution of $VO(OBu)_3$ in nonane (0.35 mmoles/ml solution). The temperature was gradually increased to 110° C. while stirring constantly. The stirring at 110° C. was continued for 1 hour. The temperature was then lowered to 60° C. and 3.7 ml of a boron trichloride solution in hexane (1.0 mmol/ml) was added to the reaction slurry under constant stirring. The slurry was filtered, the solids recovered and washed with hexane and dried in vacuo.

Polymerization

To a 1.8 liter autoclave was charged 800 ml of purified hexane, 0.9 mmoles of triisobutyl aluminum in 1 ml of heptane solution and trichlorofluoromethane activator was injected into the reactor so as to provide a 200:1 activator/vanadium ratio. 2.5 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 30 ml of butene-1. The reactor was maintained at a total pressure of 300 psig by constant ethylene flow. The polymerization was maintained for 40 minutes upon which time polymerization was stopped, the reactor cooled and the polymer was filtered off. The resulting polymer had an MI of 1.17, an MIR of 45.4. The specific activity (Kgr PE/g-V-hr-m/lC$_2$--) was 262.4.

EXAMPLE 7

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged a 3.7 ml solution of boron trichloride in hexane (1.0 mmol/ml solution). The suspension was stirred well for 1 hour at 60° C. To the slurry was added 6 ml of a solution of butyl ethyl magnesium (BEM) (0.69 mmoles/ml solution). The BEM was added dropwise at 60° C. under vigorous stirring which was continued for 1 hour. Stirring was continued for 1 hour. 4 mmoles of dried degassed n-butanol was added to the suspension at 60° C. under constant stirring which stirring was continued for 1 hour. To the slurry was then slowly added 3 ml of a solution of VO(OBu)$_3$ in nonane (0.35 mmoles/ml solution) as the temperature was gradually increased to 110° C. while stirring vigorously. Stirring was continued for 1 hour. The temperature was decreased to 60° C. and 2.4 ml of ethyl aluminum dichloride in heptane (1.57 mmoles/ml) was injected into the vial at 60° C. Stirring was continued for 1 hour at 60° C. The slurry was filtered, the solids recovered and washed with hexane and dried in vacuo.

Polymerization

To a 1.8 liter autoclave was charged 800 ml of purified hexane, 1.8 mmoles of triisobutyl aluminum in 2.0 ml of heptane solution and trichlorofluoromethane activator was injected into the reactor so as to provide a 200:1 activator/vanadium ratio. 5 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 30 ml of butene-1. The reactor was maintained at a total pressure of 300 psig by constant ethylene flow. The polymerization was maintained for 40 minutes upon which time polymerization was stopped, the reactor cooled and the polymer was filtered off. The resulting polymer had an MI of 1.10, an MIR of 54.2. The specific activity (Kgr PE/g-V-hr-m/lC$_2^{--}$) was 171.6.

EXAMPLE 8

Preparation of Catalyst Component (10568-85-13)

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged a 6 ml of a solution of butyl ethyl magnesium (BEM) obtained from Texas Alkyls, Inc. comprising 0.69 mmole BEM/ml solution. The BEM solution was added dropwise at 60° C. while stirring the slurry vigorously. Stirring was continued for 1 hour. A 2.4 ml portion of a solution of ethyl aluminum dichloride in heptane (1.57 mmoles/ml solution) was added to the reaction slurry under constant stirring which continued for 1 hour. 4 mmoles of dried and degassed n-butanol was added to the suspension at 60° C. under constant stirring which stirring was continued for 1 hour. To the reaction slurry there was then added a 3 ml portion of a solution of VO(OBu)$_3$ in nonane (0.35 mmoles/ml solution). The temperature was gradually increased to 110° C. while stirring constantly. The stirring at 110° C. was continued for 1 hour. The temperature was then lowered to 60° C. and 2.4 ml of an ethyl aluminum dichloride solution in heptane (1.57 mmoles/ml) was added to the reaction slurry under constant stirring. The slurry was filtered, the solids recovered and washed with hexane and dried in vacuo.

Polymerization

To a 1.8 liter autoclave was charged 800 ml of purified hexane, 1.8 mmoles of triisobutyl aluminum in 2 ml of heptane solution and trichlorofluoromethane activator was injected into the reactor so as to provide a 200:1 activator/vanadium ratio. 5 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 30 ml of butene-1. The reactor was maintained at a total pressure of 300 psig by constant ethylene flow. The polymerization was maintained for 40 minutes upon which time polymerization was stopped, the reactor cooled and the polymer was filtered off. The resulting polymer had an MI of 2.57, an MIR of 49.2. The specific activity (Kgr PE/g-V-hr-m/lC$_2^{--}$) was 181.7.

EXAMPLE 9

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged 2.4 ml of a solution of ethyl aluminum dichloride in heptane (1.57 mmoles/ml solution). The suspension was stirred well for 1 hour at 60° C. To the slurry was added 6 ml of butyl ethyl magnesium (BEM) (0.69 mmoles/ml solution). The BEM was added dropwise at 60° C. under vigorous stirring which was continued for 1 hour. 4 mmoles of dried and degassed n-butanol was added to the suspension at 60° C. under constant stirring which stirring was continued for 1 hour. To the slurry was then added 3 ml of a solution of VO(OBu)$_3$ in nonane (0.35 mmoles/ml solution) was added slowly to the slurry as the temperature was gradually increased to 110° C. while stirring vigorously. Stirring was continued for 1 hour. The temperature was decreased to 60° C. and 2.4 ml of ethyl aluminum dichloride in heptane (1.57 mmoles/ml) was injected into the vial at 60° C. Stirring was continued for 1 hour at 60° C. The slurry was filtered, the solids recovered and washed with hexane and dried in vacuo.

Polymerization

To a 1.8 liter autoclave was charged 800 ml of purified hexane, 1.8 mmoles of triisobutyl aluminum in 2 ml of heptane solution and trichlorofluoromethane activator was injected into the reactor so as to provide a 200:1 activator/vanadium ratio. 5 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 30 ml of butene-1. The reactor was maintained at a total pressure of 300 psig by constant ethylene flow. The polymerization was maintained for 40 minutes upon which time polymerization was stopped, the reactor cooled and the polymer was filtered off. The resulting polymer had an MI of 2.97, an MIR of 45.4. The specific activity (Kgr PE/g-V-hr-m/lC$_2^{--}$) was 183.1.

EXAMPLE 10

Preparation of Catalyst Component

Silica gel (5 g Davison 952, dehydrated at 600° C.) was charged into a 125 ml vial equipped with a stirring bar. 20 ml of dried degassed nonane was added via a syringe and the suspension stirred well at 60° C. To the stirred slurry there was charged a 6 ml of a heptane solution of butyl ethyl magnesium (BEM) obtained from Texas Alkyls, Inc. comprising 0.69 mmole BEM/ml solution. The BEM solution was added dropwise at 60° C. while stirring the slurry vigorously. Stirring was continued for 1 hour. A 6.5 ml portion of a solution of ethyl boron dichloride in hexane (1.37 mmoles/ml solution) was added to the reaction slurry under constant stirring which continued for 1 hour. To the reaction slurry there was then added a 3 ml portion of a solution of VO(OBu)$_3$ in nonane (0.35 mmoles/ml solution). The temperature was gradually increased to 110° C. while stirring constantly. The stirring at 110° C. was continued for 1 hour. The temperature was then lowered to 60° C. and 2.4 ml of a ethyl aluminum dichloride solution in heptane (1.57 mmoles/ml) was added to the reaction slurry under constant stirring. The slurry was filtered, the solids recovered and washed with hexane and dried in vacuo.

Polymerization

To a 1.8 liter autoclave was charged 800 ml of purified hexane, 1.4 mmoles of triisobutyl aluminum in 1.5 ml of heptane solution and trichlorofluoromethane activator was injected into the reactor so as to provide a 200:1 activator/vanadium ratio. 3.8 ml of a white oil slurry containing the vanadium-based solid having a concentration of 0.05 g of vanadium solid per cc was added to the reactor via syringe. The reactor was heated to 85° C., pressured to 10 psig with hydrogen, followed by pressuring to 300 psig with ethylene containing 30 ml of butene-1. The reactor was maintained at a total pressure of 300 psig by constant ethylene flow. The polymerization was maintained for 40 minutes upon which time polymerization was stopped, the reactor cooled and the polymer was filtered off. The resulting polymer had an MI of 0.85, an MIR of 63.5. The specific activity (Kgr PE/g-V-hr-m/lC$_2$$^{--}$) was 26.6.

What is claimed is:

1. A vanadium-containing catalyst component obtained by treating an inert solid support material in an inert solvent with (A) a dihydrocarbyl magnesium compound or a complex or mixture of an organic dihydrocarbyl magnesium compound and an aluminum compound, (B) optionally an oxygen-containing compound which is an alcohol, ketone or aldehyde, (C) a Group IIIa metal halide, (D) at least one vanadium compound, and as the last step a second treatment with a Group IIIa metal halide.

2. The vanadium-containing catalyst component of claim 1 wherein the dihydrocarbyl magnesium compound is represented by the formula R$^1$MgR$^2$ or a complex thereof with an aluminum compound, wherein each of R$^1$ and R$^2$, which may be the same or different, are an alkyl group, aryl group, cycloalkyl group, aralkyl group having from 1 to 20 carbon atoms, the vanadium compound is represented by the general formulas:

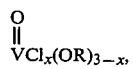
VCl$_x$(OR)$_{3-x}$, (1)

where x=0–3 and R=a hydrocarbon radical;

VCl$_y$(OR)$_{4-y}$, (2)

where y=3–4 and R=a hydrocarbon radical;

V(AcAc)$_z$, (3)

where z=2–3 and (AcAc)=acetyl acetonate group;

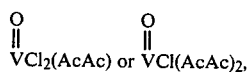
VCl$_2$(AcAc) or VCl(AcAc)$_2$, where (AcAc)=acetyl acetonate group; and

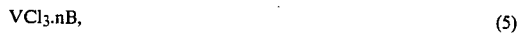
VCl$_3$.nB, (5)

where n=2–3 and B=a Lewis base which can form hydrocarbon-soluble complexes with VCl$_3$; and the Group III metal halides are selected from boron trichloride, boron hydrocarbyl halides and aluminum alkyl halides.

3. The vanadium-containing catalyst component of claim 2 wherein the Group III metal halides are selected from boron trichloride, ethyl aluminum dichloride and ethyl boron dichloride.

4. The vanadium-containing catalyst component of claim 1 wherein the inert solid support material is an inorganic oxide or mixtures of inorganic oxides.

5. The vanadium-containing catalyst component of claim 4 wherein the inorganic oxide is silica.

6. The vanadium-containing catalyst component of claim 2 wherein the vanadium compound is selected from vanadyl trichloride, vanadium tetrachloride, vanadyl tributoxy and vanadyl chloride dibutoxy.

7. The vanadium-containing catalyst component of claim 1 wherein the dihydrocarbyl magnesium compounds are selected from dialkyl magnesium compounds wherein the alkyl groups, which may be the same or different, can have 1 to 10 carbon atoms.

8. The vanadium-containing catalyst component of claim 2 wherein the oxygen-containing compound is selected from alcohols represented by the formula R$^3$OH wherein R$^3$ can be an alkyl group, aryl group, cycloalkyl group, aralkyl group, alkadienyl group or alkenyl group having from 2 to 20 carbon atoms.

9. The vanadium-containing catalyst component of claim 8 wherein the dihydrocarbyl magnesium and the alcohol are reacted together prior to contact with the inert solid support material.

10. The vanadium-containing catalyst component of claim 8 wherein the dihydrocarbyl magnesium compound is contacted with the inert solid support material prior to the addition of the oxygen-containing compound.

11. The vanadium-containing catalyst component of claim 2 wherein the Group III metal halide is selected from boron trichloride and ethyl aluminum dichloride.

12. The vanadium-containing catalyst component of claim 11 wherein the Group III metal halide is ethyl aluminum dichloride.

13. A catalyst system for the polymerization of olefins comprising (A) an organo aluminum cocatalyst, and (B) the vanadium-containing catalyst component of claim 1.

14. A catalyst system for the polymerization of olefins comprising (A) an organo aluminum cocatalyst, and (B) the vanadium-containing catalyst component of claim 2.

15. A catalyst system for the polymerization of olefins comprising (A) an organo aluminum cocatalyst, and (B) the vanadium-containing catalyst component of claim 3.

16. A catalyst system for the polymerization of olefins comprising (A) an organo aluminum cocatalyst, and (B) the vanadium-containing catalyst component of claim 4.

17. A catalyst system for the polymerization of olefins comprising (A) an organo aluminum cocatalyst, and (B) the vanadium-containing catalyst component of claim 5.

18. A catalyst system for the polymerization of olefins comprising (A) an organo aluminum cocatalyst, and (B) the vanadium-containing catalyst component of claim 6.

19. A catalyst system for the polymerization of olefins comprising (A) an organo aluminum cocatalyst, and (B) the vanadium-containing catalyst component of claim 7.

20. A catalyst system for the polymerization of olefins comprising (A) an organo aluminum cocatalyst, and (B) the vanadium-containing catalyst component of claim 8.

21. A catalyst system for the polymerization of olefins comprising (A) an organo aluminum cocatalyst, and (B) the vanadium-containing catalyst component of claim 9.

22. A catalyst system for the polymerization of olefins comprising (A) an organo aluminum cocatalyst, and (B) the vanadium-containing catalyst component of claim 10.

23. A catalyst system for the polymerization of olefins comprising (A) an organo aluminum cocatalyst, and (B) the vanadium-containing catalyst component of claim 11.

24. A catalyst system for the polymerization of olefins comprising (A) an organo aluminum cocatalyst, and (B) the vanadium-containing catalyst component of claim 12.

* * * * *